US011539580B2

(12) United States Patent
Ma

(10) Patent No.: US 11,539,580 B2
(45) Date of Patent: Dec. 27, 2022

(54) CONFIGURATION METHOD, NEGOTIATION METHOD, AND APPARATUS

(71) Applicant: HUAWEI TECHNOLOGIES CO., LTD., Shenzhen (CN)

(72) Inventor: Jingwang Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 17/134,362

(22) Filed: Dec. 26, 2020

(65) Prior Publication Data
US 2021/0119860 A1    Apr. 22, 2021

Related U.S. Application Data

(63) Continuation of application No. PCT/CN2019/092804, filed on Jun. 25, 2019.

(30) Foreign Application Priority Data

Jun. 26, 2018    (CN) .......................... 201810672067.8

(51) Int. Cl.
*H04L 41/0803* (2022.01)
*H04W 48/18* (2009.01)

(52) U.S. Cl.
CPC ......... *H04L 41/0803* (2013.01); *H04W 48/18* (2013.01)

(58) Field of Classification Search
CPC ............. H04L 41/0803; H04L 41/0853; H04L 41/0806; H04W 48/18
See application file for complete search history.

(56) References Cited

U.S. PATENT DOCUMENTS

| 2017/0303259 | A1 | 10/2017 | Lee et al. | |
| 2017/0366399 | A1 | 12/2017 | Li et al. | |
| 2019/0053147 | A1* | 2/2019 | Qiao | H04W 28/24 |
| 2020/0120589 | A1* | 4/2020 | Velev | H04W 76/25 |

FOREIGN PATENT DOCUMENTS

| CN | 107770794 A | 3/2018 |
| WO | 2017113100 A1 | 7/2017 |
| WO | 2017135857 A1 | 8/2017 |

(Continued)

OTHER PUBLICATIONS

European Search Report issued in European Application No. 19826340.2 dated Jun. 10, 2021 (8 pages).

(Continued)

*Primary Examiner* — Jamal Javaid
*Assistant Examiner* — Shawn D Miller

(57) ABSTRACT

A configuration method, a negotiation method, and an apparatus are provided. The configuration method includes: sending, by a network slice management network element, configuration information to a network device, where the configuration information includes information about a network slice and a system feature supported by the network slice; and receiving, by the network slice management network element, a configuration completion indication from the network device. Based on this solution, the related information of the network slice can be configured for the network device.

20 Claims, 8 Drawing Sheets

(56) References Cited

FOREIGN PATENT DOCUMENTS

| WO | 2018034924 A1 | 2/2018 |
|---|---|---|
| WO | 2018066977 A1 | 4/2018 |

OTHER PUBLICATIONS

3GPP TS 23.501 V2.0.1, Dec. 15, 2017, XP051379271, http://www.3gpp.org/ftp/tsg_sa/WG2_Arch/Latest_SA2_Specs/Latest_draft_S2_Specs/ (183 pages).

3GPP TS 23.501 V2.0.1 (Dec. 2017),Technical Specification 3rd Generation Partnership Project; Technical Specification Group Services and System Aspects;System Architecture for the 5G System; Stage 2 (Release 15), total 183 pages.

3GPP TS 38.413 V0.9.0 (May 2018), Technical Specification, 3rd Generation Partnership Project; Technical Specification Group Radio Access Network; NG-RAN; NG Application Protocol (NGAP) (Release 15), total 265 pages.

3GPP TR 23.742 V0.2.0 (Jun. 2018),Technical Report 3rd Generation Partnership Project; Technical Specification Group Services and System Aspects; Study on Enhancements to the Service-Based Architecture (Release 16), total 39 pages.

Huawei, HiSilicon, Telecom Italia, "Clarify NSSF discovery", 3GPP TSG-SA2 Meeting #126 Montreal, Canada, Feb. 26-Mar. 2, 2018, S2-181585, total 5 pages.

3GPP TS 23.401 V15.4.0 (Jun. 2018); 3rd Generation Partnership Project; Technical Specification Group Services and System Aspects; General Packet Radio Service (GPRS) enhancements for Evolved Universal Terrestrial Radio Access Network (E-UTRAN) access (Release 15), total 410 pages.

Office Action issued in CN Application No. 201810672067.8, dated Apr. 21, 2020, total 11 pages.

International Search Report issued in Application No. PCT/CN2019/092804, dated Aug. 28, 2019, total 4 pages.

* cited by examiner

CONFIGURATION METHOD, NEGOTIATION METHOD, AND APPARATUS

CROSS-REFERENCE TO RELATED APPLICATIONS

This application is a continuation of International Application No. PCT/CN2019/092804, filed on Jun. 25, 2019, which claims priority to Chinese Patent Application No. 201810672067.8, filed on Jun. 26, 2018, The disclosures of the aforementioned applications are hereby incorporated by reference in their entireties.

TECHNICAL FIELD

This application relates to the field of mobile communications technologies, and in particular, to a configuration method, a negotiation method, and an apparatus.

BACKGROUND

In a current network architecture, a plurality of network slices (network slice) are obtained through division on a common network infrastructure of a core network by using technologies such as virtualization, and the network slices are used to implement network services required by one or more services. To indicate a network slice of a specific type, information about the network slice may include a type of the corresponding network slice. Types of the network slice include, for example, an enhanced mobile broadband (enhanced mobile broadband, eMBB) type and an ultra low latency (ultra low latency) type. In a next-generation communications network, different types of network slices will support different system features (system feature). How to enable network devices to obtain system features that can be used by the network device has not been resolved currently.

SUMMARY

This application provides a configuration method, a negotiation method, and an apparatus, to implement configuration or application of a system feature supported by a network slice.

According to a first aspect, this application provides a configuration method. The method includes: A network slice management network element sends configuration information to a network device, where the configuration information includes information about a network slice and a system feature supported by the network slice; and the network slice management network element receives a configuration completion indication from the network device. Based on this solution, the related information of the network slice can be configured for the network device.

In a possible implementation, the network device may be an access network device, a mobility management network element, a session management network element, or a network slice selection network element.

In a possible implementation, the network device is an access network device, and the configuration information further includes identification information of a public land mobile network (PLMN) to which the network slice belongs.

In a possible implementation, the network device is a mobility management network element or a network slice selection network element; and the configuration information may further include indication information, where the indication information is used to indicate whether the system feature supported by the network slice can be used by a terminal device in a roaming state.

In a possible implementation, the system feature includes but is not limited to any one or more of the following: an internet protocol (IP) protocol data unit session (PDU session), a short messaging service over non-access stratum (SMS over NAS), and a location service (LCS).

According to a second aspect, this application provides a configuration method. The method includes: A network device receives configuration information from a network slice management network element, where the configuration information includes information about a network slice and a system feature supported by the network slice; the network device stores the configuration information; and the network device sends a configuration completion indication to the network slice management network element. Based on this solution, the related information of the network slice can be configured for the network device.

In a possible implementation, the network device may be an access network device, a mobility management network element, a session management network element, or a network slice selection network element.

In a possible implementation, the network device is a network slice selection network element, and the network slice selection network element may further receive the information about the network slice from a mobility management network element, where the information is used to request to obtain the system feature supported by the network slice; and the network slice selection network element sends the system feature supported by the network slice to the mobility management network element.

In a possible implementation, the network device is an access network device, and the access network device determines, based on the system feature supported by the network slice, a system feature supported by the access network device; and the access network device enables the system feature supported by the access network device.

In a possible implementation, the network device is a mobility management network element or a network slice selection network element; and the configuration information may further include indication information, where the indication information is used to indicate whether the system feature supported by the network slice can be used by a terminal device in a roaming state.

In a possible implementation, the system feature includes but is not limited to any one or more of the following: an internet protocol (IP) protocol data unit session (PDU session), a short messaging service over non-access stratum (SMS over NAS), and a location service (LCS).

According to a third aspect, this application provides a negotiation method. The method includes: A mobility management network element receives a first request message from a terminal device, where the first request message includes information about a first network slice that the terminal device requests to access and a first system feature corresponding to the first network slice; the mobility management network element obtains a second system feature supported by a network for the first network slice; the mobility management network element determines, based on the second system feature and the first system feature, a third system feature corresponding to the first network slice that can be used by the terminal device; and the mobility management network element sends the third system feature corresponding to the first network slice that can be used by the terminal device to the terminal device. Based on this solution, negotiation, between the terminal device and the mobility management network element, of a system feature that can be used by the terminal device can be completed.

In a possible implementation, that the mobility management network element obtains a second system feature supported by a network for the first network slice includes: The mobility management network element obtains a fourth system feature supported by a core network for the first network slice, and obtains a fifth system feature supported by an access network device for the first network slice; and the mobility management network element determines, based on the fourth system feature and the fifth system feature, the second system feature supported by the network for the first network slice.

In a possible implementation, that the mobility management network element obtains a fourth system feature supported by a core network for the first network slice includes: The mobility management network element receives, from a network slice management network element or a network slice selection network element, information about a network slice supported by the core network and a system feature supported by the network slice, where the information about the network slice includes information about the first network slice, and the system feature supported by the network slice includes the fourth system feature.

In a possible implementation, that the mobility management network element obtains a fifth system feature supported by an access network device for the first network slice comprises: The mobility management network element receives, from the access network device, information about a network slice supported by the access network device and a system feature supported by the network slice, where the information about the network slice includes information about the first network slice, and the system feature supported by the network slice includes the fifth system feature.

In a possible implementation, if the terminal device is in a roaming state, and it is determined, based on the second system feature supported by the network for the first network slice, that a system feature A in the first system feature cannot be used by the terminal device in a roaming state, the mobility management network element determines that the third system feature corresponding to the first network slice that can be used by the terminal device does not include the system feature A.

According to a fourth aspect, this application provides a negotiation method. An access network device sends, to a mobility management network element, information about a network slice supported by the access network device and a system feature supported by the network slice; and the access network device receives, from the mobility management network element, information about a network slice supported by the mobility management network element and a system feature supported by the network slice. Based on this solution, the access network device and the mobility management network element may separately send to each other, information about the network slice supported by their own and the system feature supported by the network slice, to complete system feature negotiation between the access network device and the mobility management network element.

According to a fifth aspect, this application provides a negotiation method. A terminal device sends a first request message to a mobility management network element, where the first request message includes information about a first network slice that the terminal device requests to access and a first system feature corresponding to the first network slice; and the terminal device receives, from the mobility management network element, a third system feature corresponding to the first network slice that can be used by the terminal device. Based on this solution, negotiation, between the terminal device and the mobility management network element, of a system feature that can be used by the terminal device can be completed.

According to a sixth aspect, this application provides an apparatus. The apparatus may be an access network device, a terminal device, a network slice management network element, a network device, or a chip. The apparatus has a function of implementing the embodiments of any one of the first aspect, the second aspect, the third aspect, the fourth aspect, or the fifth aspect. The function may be implemented by hardware, or may be implemented by hardware executing corresponding software. The hardware or the software includes one or more modules corresponding to the function.

According to a seventh aspect, an apparatus is provided, including a processor and a memory. The memory is configured to store a computer-executable instruction. When the apparatus runs, the processor executes the computer-executable instruction stored in the memory, to enable the apparatus to perform the configuration method according to the first aspect or any one of the implementations of the first aspect, or to enable the apparatus to perform the configuration method according to the second aspect or any one of the implementations of the second aspect, or to enable the apparatus to perform the negotiation method according to the third aspect or any one of the implementations of the third aspect, or to enable the apparatus to perform the negotiation method according to the fourth aspect or any one of the implementations of the fourth aspect, or to enable the apparatus to perform the negotiation method according to the fifth aspect or any one of the implementations of the fifth aspect.

According to an eighth aspect, this application further provides a computer-readable storage medium. The computer-readable storage medium stores an instruction, and when the instruction is run on a computer, the computer is enabled to perform the methods according to the foregoing aspects.

According to a ninth aspect, this application further provides a computer program product including an instruction. When the computer program product runs on a computer, the computer is enabled to perform the methods according to the foregoing aspects.

According to a tenth aspect, this application further provides a system. The system includes the network slice management network element in the first aspect or any one of the embodiments of the first aspect and the network device in the second aspect or any one of the embodiments of the second aspect.

According to an eleventh aspect, this application further provides a system. The system includes the mobility management network element in the third aspect or any one of the embodiments of the third aspect and the access network device in the fourth aspect or any one of the embodiments of the fourth aspect. Further, the system may further include the terminal device in the fifth aspect or any one of the embodiments of the fifth aspect.

These aspects or other aspects in this application may be clearer and more intelligible in descriptions in the following embodiments.

DESCRIPTION OF EMBODIMENTS

To make the objectives, technical solutions, and advantages of this application clearer, the following further describes this application in detail with reference to the accompanying drawings. A specific operation method in method embodiments may also be applied to an apparatus embodiment or a system embodiment. In the descriptions of this application, unless otherwise stated, "a plurality" means two or more than two.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

Figure 1:
FIG. 1 is a schematic diagram of a possible network architecture according to this application.

FIG. 1 is a schematic diagram of a possible network architecture according to this application. The network architecture includes a network slice management network element and a network device. In this application, the network slice management network element may be used to configure the network device, including configuring information about a network slice and a system feature supported by the network slice. The network device comprises an access network device, a mobility management network element, a session management network element, a network slice selection network element, or the like.

The access network device is a device that provides a wireless communication function for a terminal device. For example, the access network device includes but is not limited to: a next generation NodeB (gNodeB, gNB), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseBand unit, BBU), a transmitting and receiving point (transmitting and receiving point, TRP), a transmitting point (transmitting point, TP), a mobile switching center, and the like in 5G.

The mobility management network element is mainly used for mobility management, for example, user location update, registration of a user with a network, or user handover, in a mobile network. In 5th generation (5th generation, 5G) communication, the mobility management network element may be an access and mobility management function (access and mobility management function, AMF) network element. In future communication, for example, in 6th generation (6th generation, 6G) communication, the mobility management network element may still be an AMF network element or may have another name. This is not limited in this application.

The session management network element is mainly used for session management, for example, session establishment, modification, or release, in a mobile network. A specific function is, for example, allocating an internet protocol (internet protocol, IP) address to a user, or selecting a user plane network element that provides a packet forwarding function. In 5G, the session management network element may be a session management function (session management function, SMF) network element. In future communication such as 6G, the session management network element may still be an SMF network element or may have another name. This is not limited in this application.

The network slice selection network element is mainly used to store related information of a network slice, including identification information of the network slice, a system feature supported by the network slice, and the like. In 5G, the network slice selection network element may be a network slice selection function (network slice selection function, NSSF) network element. In future communication such as 6G, the network slice selection network element may still be an NSSF network element or may have another name. This is not limited in this application.

It may be understood that the foregoing functions may be network elements in a hardware device, software functions running on dedicated hardware, or virtualized functions instantiated on a platform (for example, a cloud platform).

For ease of description, an example in which the mobility management network element is an AMF network element, the session management network element is an SMF network element, and the network slice selection network element is an NSSF network element is used for description below in this application. Further, the AMF network element is referred to as an AMF for short, the SMF network element is referred to as an SMF for short, and the NSSF network element is referred to as an NSSF for short. In other words, in the subsequent descriptions of this application, all AMFs may be replaced with mobility management network elements, all SMFs may be replaced with session management network elements, and all NSSFs may be replaced with network slice selection network elements.

Figure 2:
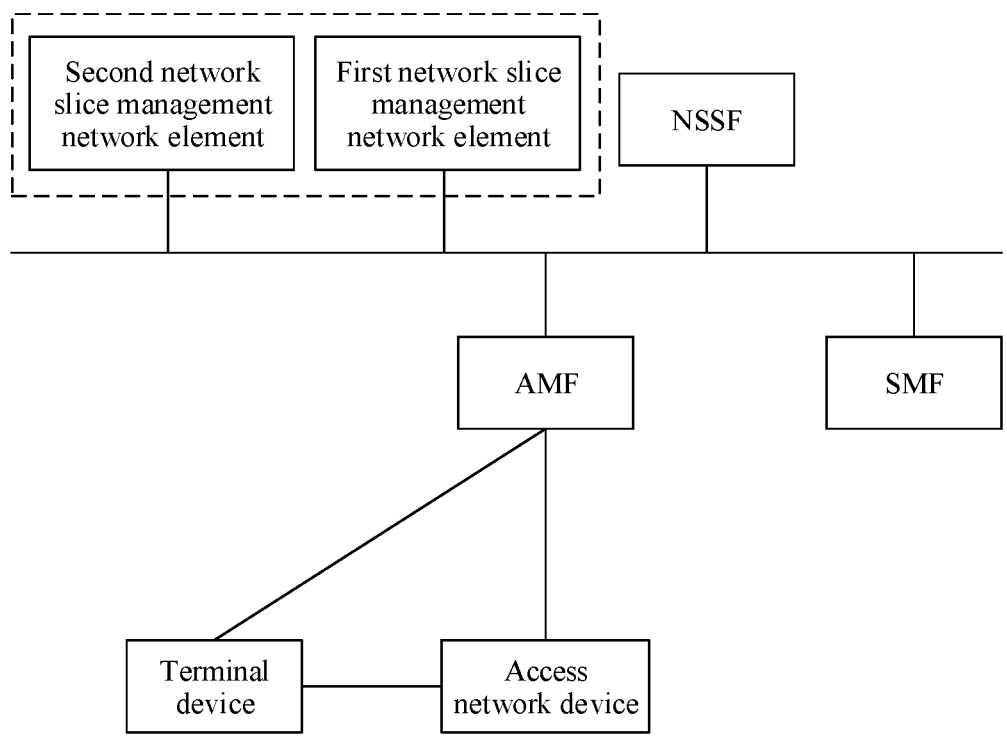
FIG. 2 is a schematic diagram of another possible network architecture according to this application.

FIG. 2 is a schematic diagram of another possible network architecture according to this application. The network architecture includes an access network device, an AMF, an SMF, an NSSF, a first network slice management network element, and a second network slice management network element. The access network device, the AMF, the SMF, and the NSSF may be collectively referred to as a network device. Optionally, the network architecture may further include a terminal device.

The first network slice management network element is used to configure a network slice for the network device on a core network side, such as an AMF, an SMF, or an NSSF. The second network slice management network element is used to configure a network slice for the access network device. During specific implementation, the first network slice management network element and the second network slice management network element may be a same network element, or may be different network elements.

The terminal device is a device with a wireless transceiver function, and may be deployed on land, for example, an indoor device, an outdoor device, a handheld device, or a vehicle-mounted device; may be deployed on the water (for example, on a ship); or may be deployed in the air (for example, on a plane, a balloon, or a satellite). The terminal device may be a mobile phone (mobile phone), a pad (Pad), a computer with a wireless transceiver function, a virtual reality (virtual reality, VR) terminal device, an augmented reality (augmented reality, AR) terminal device, a wireless terminal device in industrial control (industrial control), a wireless terminal device in self driving (self driving), a wireless terminal device in telemedicine (remote medical), a wireless terminal device in a smart grid (smart grid), a wireless terminal device in transportation safety (transportation safety), a wireless terminal device in a smart city (smart city), a wireless terminal device in a smart home (smart home), or the like.

The following describes, with reference to FIG. 1 and FIG. 2, a configuration method and a negotiation method according to this application.

Figure 3:
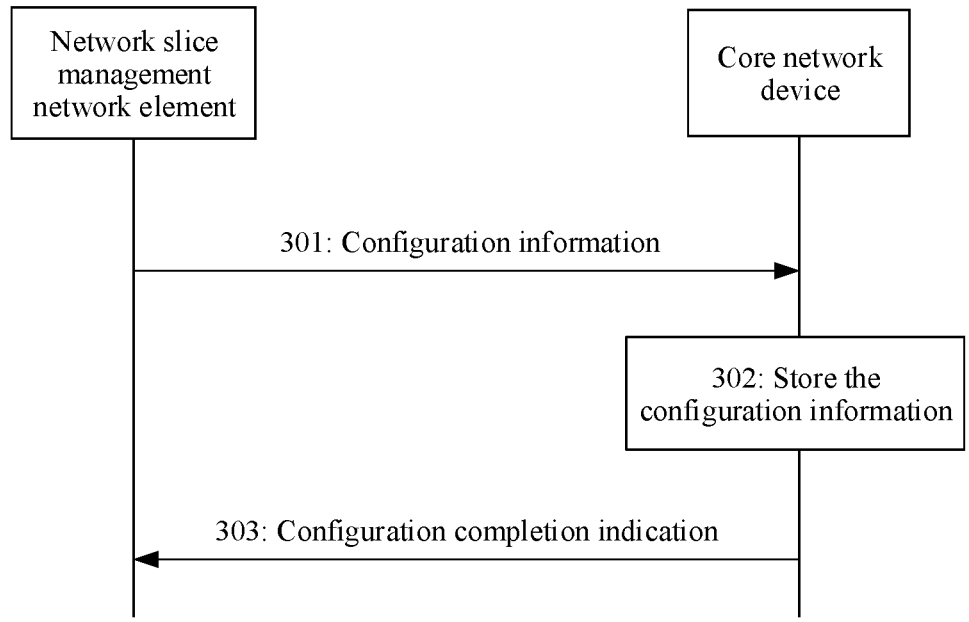
FIG. 3 is a flowchart of a configuration method according to this application.

FIG. 3 shows the configuration method according to this application. The method is used to configure related information of a network slice for a core network device. The core network device herein refers to an SMF, an AMF, or an NSSF. In other words, the SMF, the AMF, and the NSSF may all be configured according to the following method. The method includes the following steps:

Step 301: A network slice management network element sends configuration information to the core network device, and correspondingly, the core network device receives the configuration information.

The network slice management network element herein may be the network slice management network element shown in FIG. 1 or the first network slice management network element shown in FIG. 2.

The configuration information includes information about the network slice and a system feature supported by the network slice. The information about the network slice includes one or more pieces of single network slice selection assistance information (single network slice selection assistance information, S-NSSAI).

The system feature refers to a service provided by a network for a terminal device or an external application. In one network slice, one or more system features may be deployed based on a service requirement. Correspondingly, to support and implement the one or more services, a corresponding network element needs to be deployed in an access network and a core network, and the deployed network element implements a network function service related to a system feature. For example, the system features may include but is not limited to any one or a combination of multiple of an internet protocol (internet protocol, IP) protocol data unit session (protocol data unit session, PDU session), a short messaging service over non-access stratum (short messaging service over non-access stratum, SMS over NAS), a location service (location service, LCS), and the like.

The following provides a description with reference to a specific example. Table 1 shows an example of the configuration information.

TABLE 1

| Information about a network slice | System feature supported by the network slice |
| --- | --- |
| S-NSSAI 1 | System feature A, and system feature B |
| S-NSSAI 2 | System feature A, system feature B, and system feature C |
| S-NSSAI 3 | System feature B |

Table 1 shows content included in the configuration information sent by the network slice management network element to the core network device. The configuration information specifically includes (the S-NSSAI 1, the system feature A, and the system feature B), (the S-NSSAI 2, the system feature A, the system feature B, and the system feature C), and (the S-NSSAI 3 and the system feature B).

During specific implementation, the system feature in the configuration information may be an identifier of the system feature, for example, an identifier of an SMS over NAS system feature may be a system feature short message service (system feature short message service, SF_SMS). A unified description is provided herein, and details are not described later.

Optionally, the configuration information may further include indication information, and the indication information is used to indicate whether the system feature supported by the network slice can be used by a terminal device in a roaming state. If the configuration information further includes the indication information, the configuration information sent by the network slice management network element may be, for example, shown in Table 2.

TABLE 2

| Information about a network slice | System feature supported by the network slice | Indication information |
| --- | --- | --- |
| S-NSSAI 1 | System feature A | Accessible by a terminal device in a roaming state |
|  | System feature B | Inaccessible by a terminal device in a roaming state |
| S-NSSAI 2 | System feature A | Accessible by a terminal device in a roaming state |
|  | System feature B | Accessible by a terminal device in a roaming state |
|  | System feature C | Inaccessible by a terminal device in a roaming state |
| S-NSSAI 3 | System feature B | Accessible by a terminal device in a roaming state |

As shown in Table 2, for each system feature supported by the network slice, there is corresponding indication information used to indicate whether the system feature can be accessed by a terminal device in a roaming state. During specific implementation, one bit may be used to represent the indication information. For example, "1" indicates that a terminal device in a roaming state can access the system feature, and "0" indicates that a terminal device in a roaming state cannot access the system feature.

Step 302: The core network device stores the configuration information.

Specifically, the core network device stores the configuration information locally, or stores the configuration information in an external server or a database system that is specially used for data storage.

Step 303: The core network device sends a configuration completion indication to the network slice management network element, and correspondingly, the network slice management network element receives the configuration completion indication.

The configuration completion indication is used to indicate that the configuration is completed.

According to the foregoing method, the related information of the network slice can be configured for the core network device such as an AMF, an SMF, or an NSSF.

Figure 4:
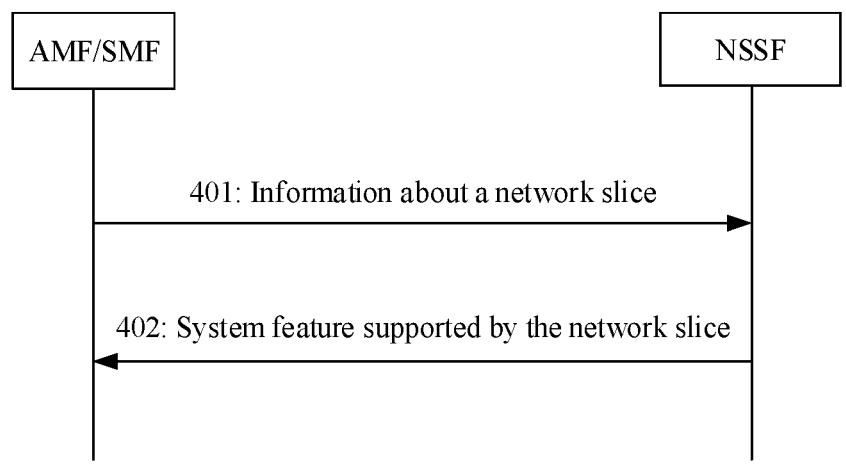
FIG. 4 is a flowchart of another configuration method according to this application.

It should be noted that, if the network slice management network element configures only the NSSF, and does not configure the AMF and the SMF, after the network slice management network element configures the NSSF, the AMF and the SMF may separately request to obtain the configuration information from the NSSF. FIG. 4 shows still another configuration method according to this application, used by an AMF or an SMF to obtain configuration information from an NSSF. Specifically, the following steps are included.

Step 401: The AMF/SMF sends information about a network slice to the NSSF, and correspondingly, the NSSF receives the information about the network slice.

The information about the network slice sent by the AMF is information about one or more network slices supported by a core network. For example, if the AMF supports a network slice identified by S-NSSAI 1 and a network slice identified by S-NSSAI 2, the information about the network slice sent by the AMF is S-NSSAI 1 and S-NSSAI 2.

The information about the network slice sent by the SMF is information about a network slice to which the SMF belongs. For example, if the SMF belongs to the network slice identified by the S-NSSAI 1, the information about the network slice sent by the SMF is the S-NSSAI 1.

Step 402: The NSSF sends a system feature supported by the network slice to the AMF/SMF, and correspondingly, the AMF/SMF receives the system feature supported by the network slice.

Using Table 1 as an example, if the information about the network slice sent by the AMF is the S-NSSAI 1 and the S-NSSAI 2, the system feature sent by the NSSF to the AMF includes: (the S-NSSAI 1, the system feature A, and the system feature B), and (the S-NSSAI 2, the system feature A, the system feature B, and the system feature C).

If the information about the network slice sent by the SMF is the S-NSSAI 1, the NSSF sends (the S-NSSAI 1, the system feature A, and the system feature B) or (the system feature A and the system feature B) to the SMF.

According to the foregoing method, a network slice management network element first configures the related information of the network slice in the NSSF, and then each network element such as each SMF and each AMF obtains, from the NSSF, the system feature supported by the network slice. Therefore, the network slice management network element does not need to separately configure each SMF and each AMF, and system resources are saved.

Figure 5:
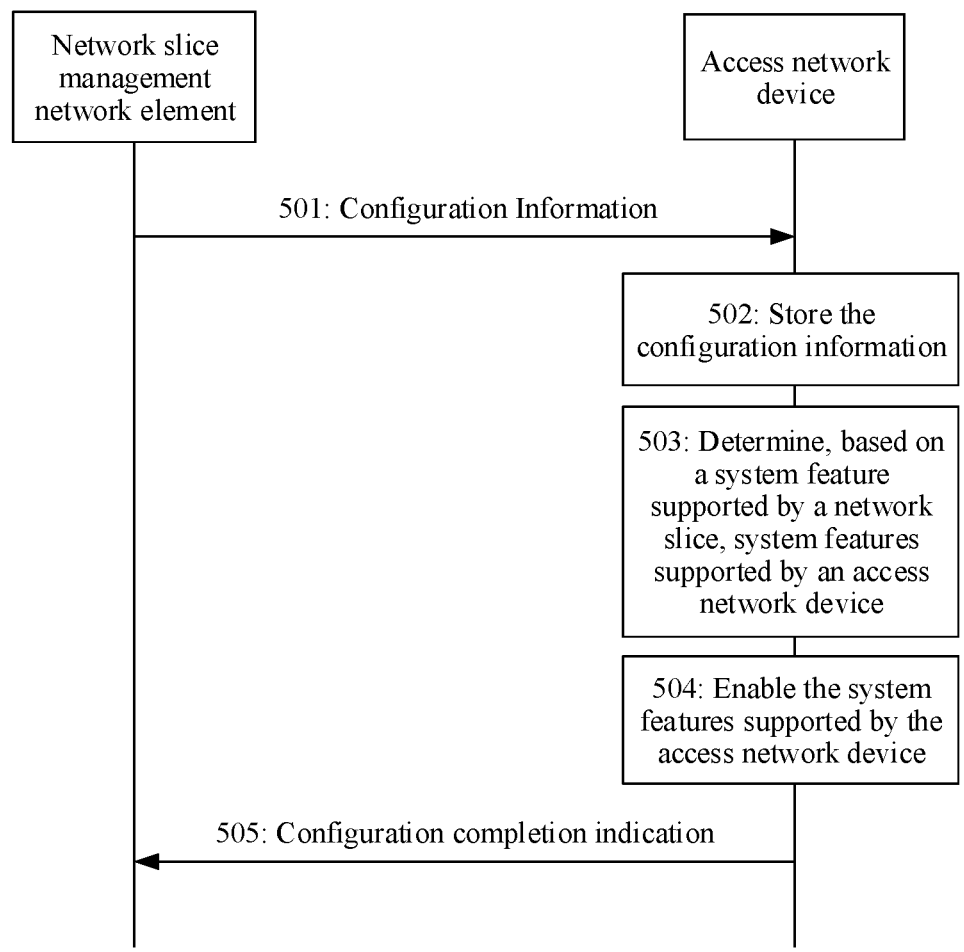
FIG. 5 is a flowchart of still another configuration method according to this application.

FIG. 5 shows still another configuration method according to this application. The method is used to configure related information of a network slice for an access network device. The method includes the following steps:

Step 501: A network slice management network element sends configuration information to the access network device, and correspondingly, the access network device receives the configuration information.

The network slice management network element herein may be the network slice management network element shown in FIG. 1 or the second network slice management network element shown in FIG. 2.

In an implementation, the configuration information sent by the network slice management network element to the access network device may be the same as the configuration information sent by the network slice management network element to the core network device in step 301. For details, refer to the foregoing description. For example, the sent configuration information is shown in Table 1 or Table 2.

In another implementation, based on Table 1 or Table 2, identification information of a public land mobile network PLMN (Public Land Mobile Network, PLMN) to which the network slice belongs may be further added to the configuration information sent by the network slice management network element to the access network device. For example, the configuration information sent by the network slice management network element to the access network device may be shown in Table 1'. Alternatively, the configuration information sent by the network slice management network element to the access network device may be shown in Table 2'.

TABLE 1'

| Information about a network slice | System feature supported by the network slice | Identification information of a PLMN |
| --- | --- | --- |
| S-NSSAI 1 | System feature A and system feature B | PLMN ID 1 |
| S-NSSAI 2 | System feature A, system feature B, and system feature C | PLMN ID 2 |
| S-NSSAI 3 | System feature B | PLMN ID 1 |

TABLE 2'

| Information about a network slice | System feature supported by the network slice | Indication information | Identification information of a PLMN |
| --- | --- | --- | --- |
| S-NSSAI 1 | System feature A | Accessible by a terminal device in a roaming state | PLMN ID 1 |
|  | System feature B | Inaccessible by a terminal device in a roaming state |  |
| S-NSSAI 2 | System feature A | Accessible by a terminal device in a roaming state | PLMN ID 2 |
|  | System feature B | Accessible by a terminal device in a roaming state |  |
|  | System feature C | Inaccessible by a terminal device in a roaming state |  |
| S-NSSAI 3 | System feature B | Accessible by a terminal device in a roaming state | PLMN ID 1 |

In a scenario in which sharing of the access network device is supported, the network slice management network may add the identification information of the PLMN to the configuration information sent to the access network device, and set a system feature supported by a network slice in the specified PLMN. When the access network device is shared, the access network device may interact with a plurality of core networks, and each core network corresponds to a separate PLMN ID, so as to implement the system feature supported by the PLMN. In addition, each PLMN may support one or more network slices. According to the configuration information in Table 2, the access network device may further determine, based on the PLMN ID corresponding to the core network, to provide the core network with configuration information corresponding to the PLMN ID.

Step 502: The access network device stores the configuration information.

Specifically, the access network device stores the configuration information locally, or stores the configuration information in an external server or a database system that is specially used for data storage.

Optionally, the method further includes the following step 503 and step 504.

Step 503: The access network device determines, based on the system feature supported by the network slice, system features supported by the access network device.

In other words, after receiving and storing the configuration information sent by the network slice management network element, the access network device may further determine whether the access network device supports these system features.

Normally, the access network device can support these system features configured by the network slice management network element for the access network device. However, in some special cases, for example, in the case of a system fault, the access network device may not support these system features.

Step 504: The access network device enables the system features supported by the access network device.

Specifically, the access network device enables functions, components, or the like corresponding to these system features.

Step 505: The access network device sends a configuration completion indication to the network slice management network element, and correspondingly, the network slice management network element receives the configuration completion indication.

The configuration completion indication is used to indicate that the configuration is completed.

According to the foregoing method, the related information of the network slice can be configured for the access network device.

The following describes the negotiation method according to this application. Before the negotiation method is performed, related information of a network slice is configured on a terminal device, an access network device, and an AMF. A specific configuration method may be the configuration method in the foregoing embodiments, or may be another configuration method. This is not limited in this application. A method for configuring the information about the network slice on the terminal device may be configured in a subscription process, or may be configured in a production process of the terminal device.

After the related information of the network slice is configured on the terminal device, the access network device, and the AMF, the following negotiation method provided in this application may be performed.

Figure 6:
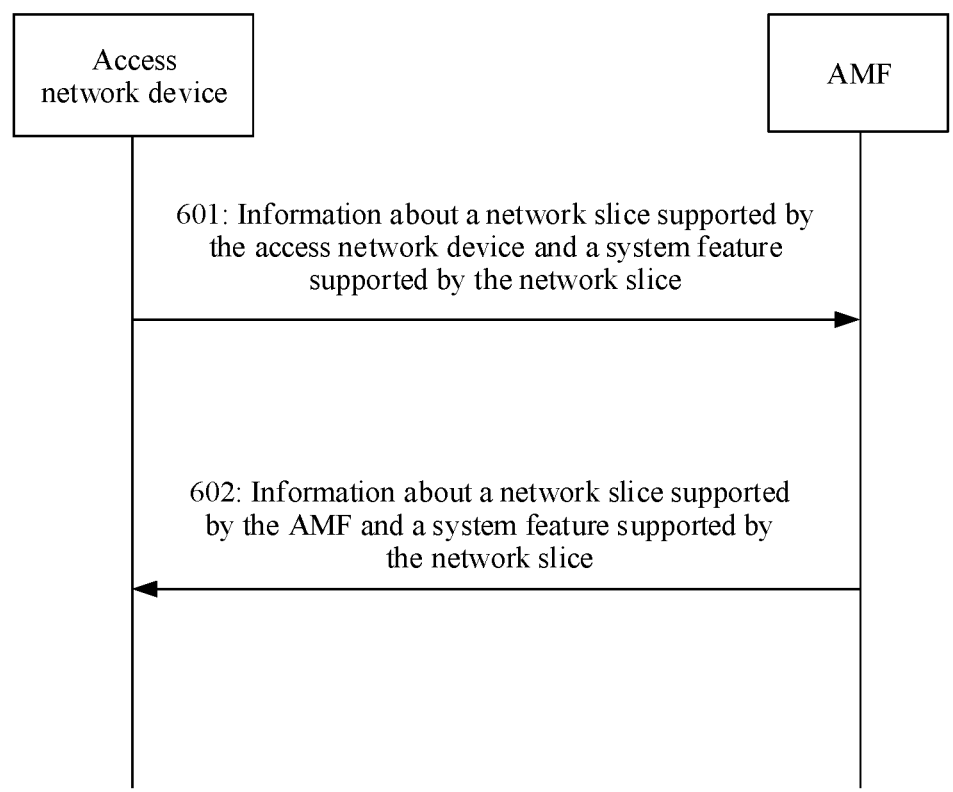
FIG. 6 is a flowchart of a negotiation method according to this application.

FIG. 6 shows a negotiation method according to this application. The method is used for negotiation between an access network device and an AMF. The method includes the following steps:

Step 601: The access network device sends, to the AMF, information about a network slice supported by the access network device and a system feature supported by the network slice, and correspondingly, the AMF receives the information about the network slice supported by the access network device and the system feature supported by the network slice.

For example, the information about the network slice supported by the access network device in the access network device and the system feature supported by the network slice may be obtained by using the method in the embodiment shown in FIG. 5.

In an example, if network slices supported by the access network device include a network slice 1 (an ID of the network slice 1 is S-NSSAI 1), a network slice 2 (an ID of the network slice 2 is S-NSSAI 2), and a network slice 3 (an ID of the network slice 3 is S-NSSAI 3), and system features supported by the network slice 1 include a system feature A and a system feature B, system features supported by the network slice 2 include a system feature A and a system feature B, and a system feature supported by the network slice 3 includes a system feature B, the information sent by the access network device to the AMF may include (the S-NSSAI 1, the system feature A, and the system feature B), (the S-NSSAI 2, the system feature A, and the system feature B), and (the S-NSSAI 3 and the system feature B).

Step 602: The AMF sends, to the access network device, information about a network slice supported by a core network and a system feature supported by the network slice, and correspondingly, the access network device may receive the information about the network slice supported by the core network and the system feature supported by the network slice.

To support a plurality of service scenarios, the core network may be divided into different network slices, and a corresponding network element and service are deployed in each network slice to support the system feature supported by the network slice. To support a terminal device in simultaneously accessing a plurality of network slices, an AMF network element may simultaneously serve a plurality of network slices of the core network, to provide access and mobility management services for these network slices.

For example, the information about the network slice supported by the core network and the system feature supported by the network slice in the AMF may be obtained by using the method in the embodiment shown in FIG. 3.

In an example, if network slices supported by the core network include a network slice 1 (an ID of the network slice 1 is S-NSSAI 1), a network slice 2 (an ID of the network slice 2 is S-NSSAI 2), and a network slice 3 (an ID of the network slice 3 is S-NSSAI 3), and system features supported by the network slice 1 include a system feature A and a system feature B, system features supported by the network slice 2 include a system feature A, a system feature B, and a system feature C, and a system feature supported by the network slice 3 includes a system feature B, the information sent by the AMF to the access network device may include (the S-NSSAI 1, the system feature A, and the system feature B), (the S-NSSAI 2, the system feature A, the system feature B, and the system feature C), and (the S-NSSAI 3 and the system feature B).

According to the foregoing method, the access network device and the AMF may exchange the information about the network slice supported by the access network device or the AMF and the system feature supported by the access network device or the AMF, to complete system feature negotiation between the access network device and the AMF.

Figure 7:
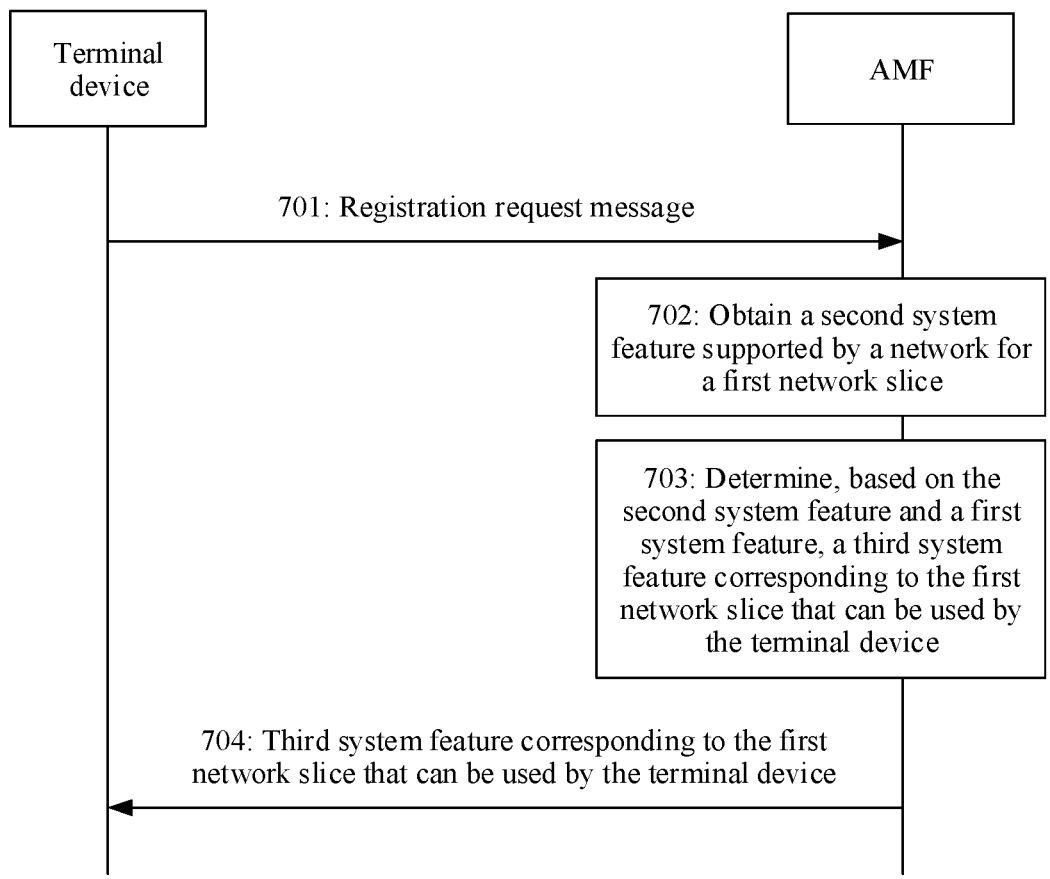
FIG. 7 is a flowchart of another negotiation method according to this application.

FIG. 7 shows another negotiation method according to this application. The method is used for negotiation between a terminal device and an AMF. The method includes the following steps:

Step 701: The terminal device sends a first request message to the AMF, where the first request message includes information about a first network slice that the terminal device requests to access and a first system feature corresponding to the first network slice. Correspondingly, the AMF may receive the first request message.

The first request message may be a registration request message, a location update message, or the like.

A network slice that the terminal device requests to access is referred to as the first network slice, and a system feature corresponding to the first network slice is referred to as the first system feature.

For example, during subscription, the terminal device may obtain the information about the first network slice and the first system feature corresponding to the first network slice. In an example, the information about the first network slice obtained by the terminal device includes, for example, S-NSSAI 2 and S-NSSAI 3. A first system feature corresponding to a network slice 1 includes a system feature A, a system feature B, and a system feature D; and a first system feature corresponding to a network slice 3 includes a system feature B and a system feature C. In this case, the first request message sent by the terminal device to the AMF may include (the S-NSSAI 2, the system feature A, the system feature B, and the system feature D), and (the S-NSSAI 3, the system feature B, and the system feature C).

Step 702: The AMF obtains a second system feature supported by a network for the first network slice.

The network herein may be a core network or an access network.

In an implementation, the AMF may obtain a fourth system feature supported by the core network for the first network slice, obtain a fifth system feature supported by an access network device for the first network slice, and then determine, based on the fourth system feature and the fifth system feature, the second system feature supported by the network for the first network slice.

For example, the AMF may obtain, by using the method shown in FIG. 3 or FIG. 4, the information about the first network slice and the fourth system feature supported by the first network slice. Specifically, the AMF may receive, from a network slice management network element or a network slice selection network element, information about a network slice supported by the core network and a system feature supported by the network slice, where the information about the network slice includes the information about the first network slice, and the system feature supported by the network slice includes the fourth system feature. For example, fourth system features supported by the first network slice (for example, a network slice 2 and a network slice 3) obtained by the AMF are: a system feature A, a system feature B, and a system feature C that are supported by the network slice 2 and a system feature B that is supported by the network slice 3.

The AMF may further receive, from the access network device, information about a network slice supported by the access network device and a system feature supported by the network slice, where the information about the network slice includes the information about the first network slice, and the system feature supported by the network slice includes the fifth system feature. For example, fifth system features supported by the first network slice (for example, the network slice 2 and the network slice 3) obtained by the AMF are: the system feature A and the system feature B that are supported by the network slice 2 and the system feature B that is supported by the network slice 3.

The AMF may determine, based on the fourth system feature and the fifth system feature, the second system feature supported by the network for the first network slice. Specifically, the determined second system feature is an intersection set of the fourth system feature and the fifth system feature. A table is used below for description. As shown in Table 3, the fourth system feature supported by the core network for the first network slice, the fifth system feature supported by the access network device for the first network slice, and the determined second system feature supported by the network for the first network slice are included.

TABLE 3

| Information about first network slice: S-NSSAI 2 and S-NSSAI 3 | | |
|---|---|---|
| Fourth system feature supported by a core network for the first network slice | Fifth system feature supported by an access network device for the first network slice | Second system feature supported by a network for the first network slice |
| S-NSSAI 2: system feature A, system feature B, and system feature C | S-NSSAI 2: system feature A, and system feature B | S-NSSAI 2: system feature A, and system feature B |
| S-NSSAI 3: system feature B | S-NSSAI 3: system feature B | S-NSSAI 3: system feature B |

Further, indication information may be added for each system feature in Table 3, and the indication information is used to indicate whether the system feature can be accessed by a terminal device in a roaming state. For example, Table 3 to which the indication information is added may be shown in Table 3'.

TABLE 3'

| Information about first network slice: S-NSSAI 2 and S-NSSAI 3 | | |
|---|---|---|
| Fourth system feature supported by a core network for the first network slice | Fifth system feature supported by an access network device for the first network slice | Second system feature supported by a network for the first network slice |
| S-NSSAI 2: (system feature A, accessible by a terminal device in a roaming state), (system feature B, accessible by a terminal device in a roaming state), and (system feature C, inaccessible by a terminal device in a roaming state) | S-NSSAI 2: (system feature A, accessible by a terminal device in a roaming state), and (system feature B, accessible by a terminal device in a roaming state) | S-NSSAI 2: (system feature A, accessible by a terminal device in a roaming state), and (system feature B, accessible by a terminal device in a roaming state) |
| S-NSSAI 3: (system feature B, accessible by a terminal device in a roaming state) | S-NSSAI 3: (system feature B, accessible by a terminal device in a roaming state) | S-NSSAI 3: (system feature B, accessible by a terminal device in a roaming state) |

Step 703: The AMF determines, based on the second system feature and the first system feature, a third system feature corresponding to the first network slice that can be used by the terminal device.

The AMF may determine, based on the second system feature and the first system feature, the third system feature corresponding to the first network slice that can be used by the terminal device. Specifically, the determined third system feature corresponding to the first network slice that can be used by the terminal device is an intersection set of the second system feature and the first system feature. A table is used below for description. As shown in Table 4, the second system feature supported by the network for the first network slice, the first system feature corresponding to the first network slice supported by the terminal device, and the third system feature corresponding to the first network slice that can be used by the terminal device are included.

TABLE 4

Information about first network slice: S-NSSAI 2 and S-NSSAI 3

| Second system feature supported by a network for the first network slices | First system feature corresponding to the first network slice supported by a terminal device | Third system feature corresponding to the first network slice that can be used by the terminal device |
| --- | --- | --- |
| S-NSSAI 2: system feature A, and system feature B | S-NSSAI 2: system feature A, system feature B, and system feature D | S-NSSAI 2: system feature A, and system feature B |
| S-NSSAI 3: system feature B | S-NSSAI 3: system feature B, system feature C | S-NSSAI 3: system feature B |

Further, if the terminal device is in a roaming state, and it is determined, based on the second system feature supported by the network for the first network slice, that the system feature A in the first system feature cannot be used by the terminal device in a roaming state (for example, may be determined based on Table 3'), the AMF determines that the third system feature corresponding to the first network slice that can be used by the terminal device does not include the system feature A. For example, in table 4, if the system feature A corresponding to the network slice 2 cannot be accessed by the terminal device, the determined third system feature corresponding to the first network slice that can be used by the terminal device includes the system feature B corresponding to the S-NSSAI 2 and the system feature B corresponding to the S-NSSAI 3.

It should be noted that the system feature A, the system feature B, and the system feature C are merely names used for distinguishing purpose. In an actual application, the system features may be distinguished by using identification information of the system features.

Step 704: The AMF sends, to the terminal device, the third system feature corresponding to the first network slice that can be used by the terminal device, and correspondingly, the terminal device may receive the third system feature corresponding to the first network slice that can be used by the terminal device.

In an implementation, after receiving the third system feature corresponding to the first network slice that can be used by the terminal device, the terminal device may perform the following operation: determining a system feature of the first network slice that can be used, thereby avoiding a case in which a system feature that is not allowed or a system feature that is not supported by the first network slice is requested for the first network slice after the terminal device accesses the network, and further avoiding a case in which a request for a system feature fails or is rejected, to ensure service reliability of the terminal device and reduce load of the network slices.

According to the foregoing method, negotiation, between the terminal device and the AMF, of a system feature that can be used by the terminal device can be completed.

It may be understood that to implement the foregoing functions, each network element includes a corresponding hardware structure and/or software module for implementing each function. A person skilled in the art should easily be aware that, in combination with the example units and algorithm steps described in the embodiments disclosed in this specification, the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 8:
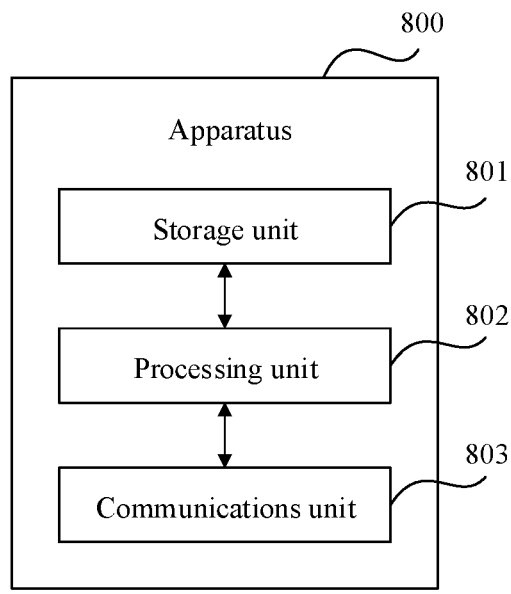
FIG. 8 is a schematic diagram of an apparatus according to this application.

When an integrated unit is used, FIG. 8 is a possible example block diagram of an apparatus according to an embodiment of the present invention. The apparatus 800 may exist in a form of software. The apparatus 800 may include a processing unit 802 and a communications unit 803. In an implementation, the communications unit 803 may include a receiving unit and a sending unit. The processing unit 802 is configured to control and manage an action of the apparatus 800. The communications unit 803 is configured to support the apparatus 800 in communicating with another network entity. The apparatus 800 may further include a storage unit 801, configured to store program code and data that are of the apparatus 800.

The processing unit 802 may be a processor or a controller, for example, may be a general purpose central processing unit (central processing unit, CPU), a general purpose processor, a digital signal processor (digital signal processor, DSP), an application-specific integrated circuit (application specific integrated circuit, ASIC), a field programmable gate array (field programmable gate array, FPGA) or another programmable logic device, a transistor logic device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications unit 803 may be a communications interface, a transceiver, a transceiver circuit, or the like. The communications interface is a general term. During specific implementation, the communications interface may include a plurality of interfaces. The storage unit 801 may be a memory.

The apparatus 800 may be an access network device, or may be a chip in an access network device. The processing unit 802 may support the apparatus 800 in performing the actions of the access network device in the foregoing method examples. For example, the processing unit 802 is configured to support the apparatus 800 in performing step 502 to step 504 in FIG. 5, step 702 and step 703 in FIG. 7, and/or another process used for the technology described in this specification. The communications unit 803 is configured to support the apparatus 800 in communicating with a mobility management network element, a network slice management network element, and a terminal device. For example, the communications unit is configured to support the apparatus 800 in performing step 501 and step 505 in FIG. 5, step 601 and step 602 in FIG. 6, and step 701 and step 704 in FIG. 7.

Specifically, when the communications unit 803 includes the sending unit and the receiving unit, in an embodiment, the receiving unit is configured to receive a first request message from a terminal device, where the first request message includes information about a first network slice that the terminal device requests to access and a first system feature corresponding to the first network slice;

the processing unit is configured to: obtain a second system feature supported by a network for the first network slice, and determine, based on the second system feature and the first system feature, a third system feature corresponding to the first network slice that can be used by the terminal device; and the sending unit is configured to send, to the terminal device, the third system feature corresponding to the first network slice that can be used by the terminal device.

In a possible implementation, the processing unit is specifically configured to: obtain a fourth system feature supported by a core network for the first network slice, and obtain a fifth system feature supported by an access network device for the first network slice; and determine, based on the fourth system feature and the fifth system feature, the second system feature supported by the network for the first network slice.

In a possible implementation, the receiving unit is further configured to receive, from a network slice management network element or a network slice selection network element, information about a network slice supported by the core network and a system feature supported by the network slice, where the information about the network slice includes information about the first network slice, and the system feature supported by the network slice includes the fourth system feature.

In a possible implementation, the receiving unit is further configured to receive, from the access network device, information about a network slice supported by the access network device and a system feature supported by the network slice, where the information about the network slice includes information about the first network slice, and the system feature supported by the network slice includes the fifth system feature.

In a possible implementation, if the terminal device is in a roaming state, and it is determined, based on the second system feature supported by the network for the first network slice, that a system feature A in the first system feature cannot be used by the terminal device in a roaming state, the processing unit is further configured to determine that the third system feature corresponding to the first network slice that can be used by the terminal device does not include the system feature A.

Specifically, when the communications unit 803 includes the sending unit and the receiving unit, in still another embodiment, the sending unit is configured to send, to the mobility management network element, information about a network slice supported by the access network device and a system feature supported by the network slice; and the receiving unit is configured to receive, from the mobility management network element, information about a network slice supported by the mobility management network element and a system feature supported by the network slice.

The apparatus 800 may alternatively be the network slice management network element in this application, or may be a chip in the network slice management network element. The processing unit 802 may support the apparatus 800 in performing the actions of the network slice management network element in the foregoing method examples. The communications unit 803 may support the apparatus 800 in communicating with the access network device and the mobility management network element. For example, the communications unit 803 is configured to support the apparatus 800 in performing step 301 and step 303 in FIG. 3 and step 501 and step 505 in FIG. 5.

Specifically, when the communications unit 803 includes the sending unit and the receiving unit, in an embodiment, the sending unit is configured to send configuration information to a network device, where the configuration information includes information about a network slice and a system feature supported by the network slice; and the receiving unit is configured to receive a configuration completion indication from the network device.

In a possible implementation, the network device is an access network device, a mobility management network element, a session management network element, or a network slice selection network element.

In a possible implementation, the network device is an access network device, and the configuration information further includes identification information of a public land mobile network PLMN to which the network slice belongs.

In a possible implementation, the network device is a mobility management network element or a network slice selection network element; and the configuration information further includes indication information, and the indication information is used to indicate whether the system feature supported by the network slice can be used by a terminal device in a roaming state.

The apparatus 800 may alternatively be the terminal device in this application, or may be a chip in the terminal device. For example, the processing unit 802 may support the apparatus 800 in performing the actions of the terminal device in the foregoing method examples. The communications unit 803 may support communication between the apparatus 800 and an access network device. For example, the communications unit 803 is configured to support the apparatus 800 in performing step 701 and step 704 in FIG. 7.

Specifically, when the communications unit 803 includes the sending unit and the receiving unit, in an embodiment, the sending unit is configured to send a first request message to a mobility management network element, where the first request message includes information about a first network slice that the terminal device requests to access and a first system feature corresponding to the first network slice; and the receiving unit is configured to receive, from the mobility management network element, a third system feature corresponding to the first network slice that can be used by the terminal device.

The apparatus 800 may alternatively be the network device in this application, or may be a chip in the network device. The network device may be a mobility management network element, a session management network element, or an access network device. The processing unit 802 may support the apparatus 800 in performing the actions of the network device in the foregoing method examples. For example, the processing unit 802 is configured to support the apparatus 800 in performing step 302 in FIG. 3 and/or another process of the technology described in this specification. The communications unit 803 is configured to support communication between the apparatus 800 and a network slice management network element. For example, the communications unit is configured to support the apparatus 800 in performing step 301 and step 303 in FIG. 3.

Specifically, when the communications unit 803 includes the sending unit and the receiving unit, in an embodiment, the receiving unit is configured to receive configuration information from the network slice management network element, where the configuration information includes information about a network slice and a system feature supported by the network slice; the processing unit is configured to store the configuration information in the storage unit; and the sending unit is configured to send a configuration completion indication to the network slice management network element.

In a possible implementation, the network device is an access network device, a mobility management network element, a session management network element, or a network slice selection network element.

In a possible implementation, the network device is a network slice selection network element, and the receiving unit is further configured to receive, from a mobility management network element, the information about the network slice, to request to obtain the system feature supported by the network slice; and the sending unit is further configured to send the system feature supported by the network slice to the mobility management network element.

In a possible implementation, the network device is an access network device, and the processing unit is further configured to: determine, based on the system feature supported by the network slice, a system feature supported by the access network device; and enable the system feature supported by the access network device.

In a possible implementation, the network device is a mobility management network element or a network slice selection network element; and the configuration information further includes indication information, and the indication information is used to indicate whether the system feature supported by the network slice can be used by a terminal device in a roaming state.

In a possible implementation, the system feature includes but is not limited to any one or more of the following: an internet protocol (IP) protocol data unit session (PDU session), a short messaging service over non-access stratum SMS over NAS, and a location service LCS.

Figure 9:
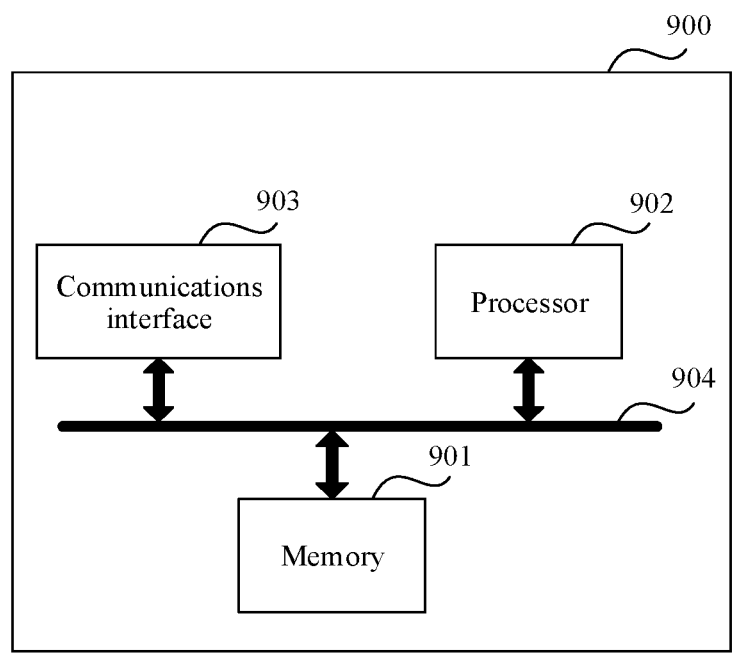
FIG. 9 is a schematic diagram of an apparatus according to this application.

FIG. 9 is a schematic diagram of an apparatus according to this application. The apparatus may be the network slice management network element, the mobility management network element, or the session management network element. The apparatus 900 includes a processor 902, a communications interface 903, and a memory 901. Optionally, the apparatus 900 may further include a bus 904. The communications interface 903, the processor 902, and the memory 901 may be connected to each other by using the bus 904. The bus 904 may be a peripheral component interconnect (peripheral component interconnect, PCI for short) bus, an extended industry standard architecture (extended industry standard architecture, EISA for short) bus, or the like. The bus 904 may be classified into an address bus, a data bus, a control bus, and the like. For ease of representation, only one thick line is used to represent the bus in FIG. 9, but this does not mean that there is only one bus or only one type of bus.

The processor 902 may be a CPU, a microprocessor, an ASIC, or one or more integrated circuits configured to control program execution in the solutions of this application.

The communications interface 903 uses any apparatus such as a transceiver that is configured to communicate with another device or a communications network, such as the Ethernet, a radio access network (radio access network, RAN), a wireless local area network (wireless local area networks, WLAN), or a wired access network.

The memory 901 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, or an optical disc storage (including a compressed optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor by using the bus 904. Alternatively, the memory may be integrated with the processor.

The memory 901 is configured to store a computer-executable instruction for executing the solutions in this application, and the processor 902 controls the execution of the computer-executable instruction. The processor 902 is configured to execute the computer-executable instruction stored in the memory 901, to implement the configuration method and the negotiation method that are provided in the foregoing embodiments of this application.

Optionally, the computer-executable instruction in this embodiment of this application may also be referred to as application program code, and this is not specifically limited in this embodiment of this application.

Figure 10:
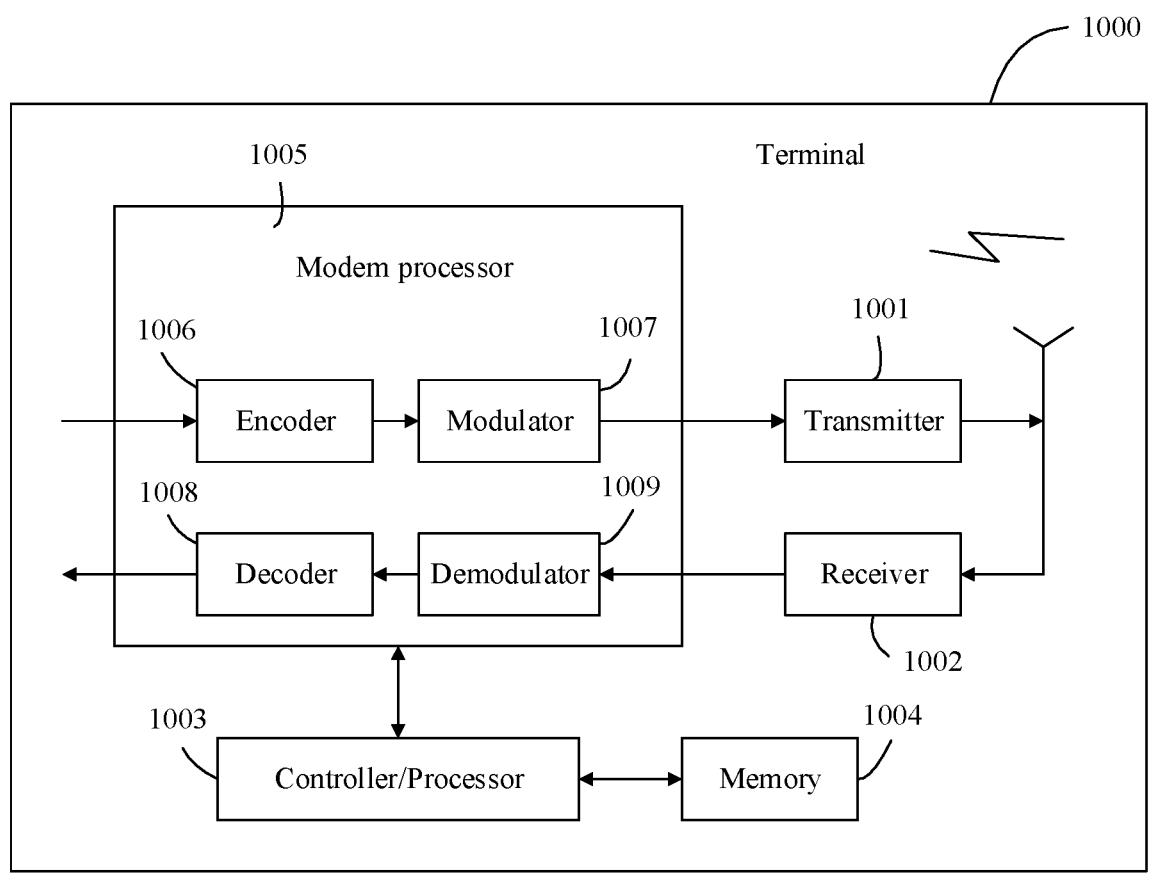
FIG. 10 is a schematic diagram of a terminal device according to this application.

FIG. 10 is a simplified schematic diagram of a possible design structure of a terminal device according to an embodiment of the present invention. The terminal device 1000 includes a transmitter 1001, a receiver 1002, and a processor 1003. The processor 1003 may alternatively be a controller, and is represented as a "controller/processor 1003" in FIG. 10. Optionally, the terminal device 1000 may further include a modem processor 1005. The modem processor 1005 may include an encoder 1006, a modulator 1007, a decoder 1008, and a demodulator 1009.

In an example, the transmitter 1001 adjusts (for example, performs analog conversion, filtering, amplification, and up-conversion on) an output sample and generates an uplink signal. The uplink signal is transmitted to the access network device in the foregoing embodiments through an antenna. On a downlink, the antenna receives a downlink signal transmitted by the access network device in the foregoing embodiments. The receiver 1002 adjusts (for example, performs filtering, amplification, down-conversion, and digitization on) the signal received from the antenna and provides an input sample. In the modem processor 1005, the encoder 1006 receives service data and a signaling message that are to be sent over an uplink, and processes (for example, formats, encodes, and interleaves) the service data and the signaling message. The modulator 1007 further processes (for example, performs symbol mapping and modulation on) encoded service data and an encoded signaling message and provides the output sample. The demodulator 1009 processes (for example, demodulates) the input sample and provides symbol estimation. The decoder 1008 processes (for example, de-interleaves and decodes) the symbol estimation and provides decoded data and a decoded signaling message that are to be sent to the terminal device 1000. The encoder 1006, the modulator 1007, the demodulator 1009, and the decoder 1008 may be implemented by the combined modem processor 1005. These units perform processing based on a radio access technology (for example, an access technology of an LTE or another evolution system) used by a radio access network. It should be noted that when the terminal device 1000 does not include the modem processor 1005, the foregoing functions of the modem processor 1005 may alternatively be performed by the processor 1003.

The processor 1003 controls and manages an action of the terminal device 1000, and is configured to perform a process performed by the terminal device 1000 in the foregoing embodiments of this application. For example, the processor 1003 is further configured to perform the processes of the terminal device in the methods shown in FIG. 7 and/or another process of the technical solutions described in this application.

Further, the terminal device 1000 may further include a memory 1004, and the memory 1004 is configured to store program code and data of the terminal device 1000.

Figure 11:
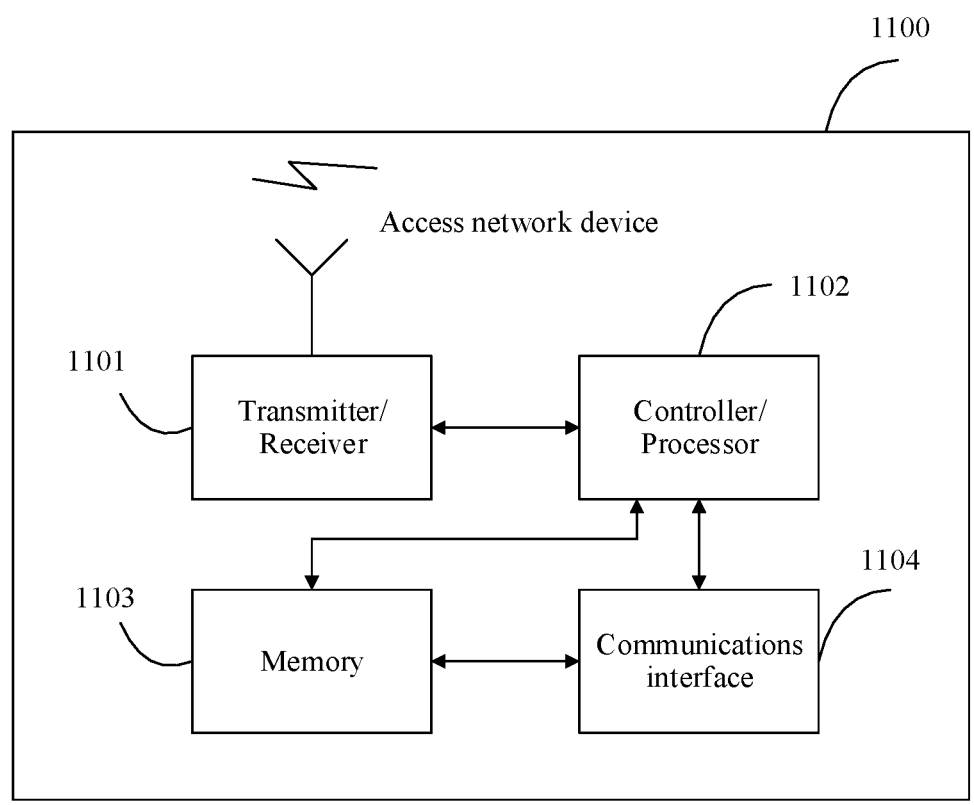
FIG. 11 is a schematic diagram of an access network device according to this application.

FIG. 11 is a possible schematic structural diagram of an access network device according to an embodiment of the present invention. The access network device 1100 includes a processor 1102 and a communications interface 1104. The processor 1102 may alternatively be a controller, and is represented as a "controller/processor 1102" in FIG. 11. The communications interface 1104 is configured to support the access network device in communicating with another network element (for example, a mobility management network element or a network slice management network element). Further, the access network device 1100 may further include a transmitter/receiver 1101. The transmitter/receiver 1101 is configured to support radio communication between the access network device and the terminal device in the foregoing embodiments. The processor 1102 may perform various functions for communicating with the terminal device. On an uplink, an uplink signal, from the terminal device received through an antenna, is demodulated (for example, a high frequency signal is demodulated into a baseband signal) by the receiver 1101, and is further processed by the processor 1102 to restore service data and a signaling message that are sent by the terminal device. On a downlink, the service data and the signaling message are processed by the processor 1102, and are modulated (for example, a baseband signal is modulated into a high frequency signal) by the transmitter 1101 to generate a downlink signal. The downlink signal is transmitted to the terminal device through the antenna. It should be noted that the foregoing demodulation or modulation function may alternatively be implemented by the processor 1102.

For example, the processor 1102 is further configured to perform the processes of the access network device in the methods shown in FIG. 5 to FIG. 7 and/or another process of the technical solutions described in this application.

Further, the access network device 1100 may further include a memory 1103, and the memory 1103 is configured to store program code and data of the access network device 1100.

It may be understood that FIG. 11 shows only a simplified design of the access network device 1100. In actual application, the access network device 1100 may include any quantity of transmitters, receivers, processors, controllers, memories, communications units, and the like, and all access network devices that can implement the embodiments of the present invention fall within the protection scope of the embodiments of the present invention.

All or some of the foregoing embodiments may be implemented through software, hardware, firmware, or any combination thereof. When software is used to implement the embodiments, the embodiments may be implemented all or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The various illustrative logical units and circuits described in the embodiments of this application may implement or operate the described functions through a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Optionally, the storage medium may further be integrated into a processor. The processor and the storage medium may be disposed in an ASIC, and the ASIC may be disposed in a terminal device. Optionally, the processor and the storage medium may also be disposed in different components of a terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, definitely, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A negotiation method, comprising:
receiving, by a mobility management network element, a first request message from a terminal device, wherein the first request message comprises information about a first network slice that the terminal device requests to access and a first system feature corresponding to the first network slice;
obtaining, by the mobility management network element, a second system feature supported by a network for the first network slice;
determining, by the mobility management network element based on the second system feature and the first system feature, a third system feature corresponding to the first network slice that can be used by the terminal device, wherein the determined third system feature is an intersection set of the second system feature and the first system feature; and
sending, by the mobility management network element, the third system feature corresponding to the first network slice that can be used by the terminal device to the terminal device.

2. The method according to claim 1, wherein the obtaining, by the mobility management network element, a second system feature supported by a network for the first network slice comprises:
obtaining, by the mobility management network element, a fourth system feature supported by a core network for the first network slice, and obtaining, by the mobility management network element, a fifth system feature supported by an access network device for the first network slice; and
determining, by the mobility management network element based on the fourth system feature and the fifth system feature, the second system feature supported by the network for the first network slice.

3. The method according to claim 2, wherein the obtaining, by the mobility management network element, a fourth system feature supported by a core network for the first network slice comprises:
receiving, by the mobility management network element from a network slice management network element, information about a network slice supported by the core network and a system feature supported by the network slice, wherein the information about the network slice comprises information about the first network slice, and the system feature supported by the network slice comprises the fourth system feature.

4. The method according to claim 3, wherein the method further comprises:

receiving, by the mobility management network element, indication information from the network slice management network element, wherein the indication information indicates whether the system feature supported by the network slice can be used by a terminal device in a roaming state.

5. The method according to claim 3, wherein the method further comprises:
storing, by the mobility management network element, the information about a network slice and the system feature; and
sending, by the mobility management network element, a configuration completion indication to the network slice management network element.

6. The method according to claim 2, wherein the obtaining, by the mobility management network element, a fourth system feature supported by a core network for the first network slice comprises:
sending, by the mobility management network element, information about the first network slice to a network slice selection network element;
receiving, by the mobility management network element from the network slice selection network element, a system feature supported by the first network slice, wherein the system feature supported by the first network slice comprises the fourth system feature.

7. The method according to claim 2, wherein obtaining, by the mobility management network element, a fifth system feature supported by an access network device for the first network slice comprises:
receiving, by the mobility management network element from the access network device, information about a network slice supported by the access network device and a system feature supported by the network slice, wherein the information about the network slice comprises information about the first network slice, and the system feature supported by the network slice comprises the fifth system feature.

8. The method according to claim 1, wherein the method further comprises:
if the terminal device is in a roaming state, and it is determined, based on the second system feature supported by the network for the first network slice, that a system feature A in the first system feature cannot be used by a terminal device in a roaming state, determining, by the mobility management network element, that the third system feature corresponding to the first network slice that can be used by the terminal device does not comprise the system feature A.

9. The method according to claim 1, wherein the system feature comprises any one or more of the following: an internet protocol (IP) protocol data unit session (PDU session), a short messaging service over non-access stratum (SMS over NAS), and a location service (LCS).

10. An apparatus, comprising:
a processor; and
a memory coupled to the processor and storing instructions that, when executed by the processor, cause the communications apparatus to:
receive a first request message from a terminal device, wherein the first request message comprises information about a first network slice that the terminal device requests to access and a first system feature corresponding to the first network slice;
obtain a second system feature supported by a network for the first network slice;

determine, based on the second system feature and the first system feature, a third system feature corresponding to the first network slice that can be used by the terminal device, wherein the determined third system feature is an intersection set of the second system feature and the first system feature; and send the third system feature corresponding to the first network slice that can be used by the terminal device to the terminal device.

11. An apparatus, comprising:

a processor; and a memory coupled to the processor and storing instructions that, when executed by the processor, cause the communications apparatus to:

receive a first request message from a terminal device, wherein the first request message comprises information about a first network slice that the terminal device requests to access and a first system feature corresponding to the first network slice;

obtain a second system feature supported by a network for the first network slice;

determine, based on the second system feature and the first system feature, a third system feature corresponding to the first network slice that can be used by the terminal device;

obtain a fourth system feature supported by a core network for the first network slice;

obtain a fifth system feature supported by an access network device for the first network slice;

wherein the communication apparatus is configured to obtain the second system feature supported by the network for the first network slice by determining, based on the fourth system feature and the fifth system feature, the second system feature supported by the network for the first network slice; and send the third system feature corresponding to the first network slice that can be used by the terminal device to the terminal device.

12. The apparatus according to claim 11, wherein the instructions cause the communications apparatus to:

receive, from a network slice management network element, information about a network slice supported by the core network and a system feature supported by the network slice, wherein the information about the network slice comprises information about the first network slice, and the system feature supported by the network slice comprises the fourth system feature.

13. The apparatus according to claim 12, wherein the instructions further cause the communications apparatus to:

receive indication information from the network slice management network element, wherein the indication information indicates whether the system feature supported by the network slice can be used by a terminal device in a roaming state.

14. The apparatus according to claim 12, wherein the instructions further cause the communications apparatus to:

store the information about a network slice and the system feature; and send a configuration completion indication to the network slice management network element.

15. The apparatus according to claim 11, wherein the instructions cause the communications apparatus to:

send information about the first network slice to a network slice selection network element;

receive from the network slice selection network element, a system feature supported by the first network slice, wherein the system feature supported by the first network slice comprises the fourth system feature.

16. The apparatus according to claim 11, wherein the instructions cause the communications apparatus to:

receive, from the access network device, information about a network slice supported by the access network device and a system feature supported by the network slice, wherein the information about the network slice comprises information about the first network slice, and the system feature supported by the network slice comprises the fifth system feature.

17. The apparatus according to claim 10, wherein if the terminal device is in a roaming state, and it is determined, based on the second system feature supported by the network for the first network slice, that a system feature A in the first system feature cannot be used by a terminal device in a roaming state, the instructions further cause the communications apparatus to:

determine that the third system feature corresponding to the first network slice that can be used by the terminal device does not comprise the system feature A.

18. The apparatus according to claim 10, wherein the system feature comprises any one or more of the following: an interne protocol (IP) protocol data unit session (PDU session), a short messaging service over non-access stratum (SMS over NAS), and a location service (LCS).

19. A system, comprising an access network device and a mobility management network element, wherein the mobility management network element is configured to:

receive a first request message from a terminal device, wherein the first request message comprises information about a first network slice that the terminal device requests to access and a first system feature corresponding to the first network slice;

obtain a fourth system feature supported by a core network for the first network slice, and obtain a fifth system feature supported by the access network device for the first network slice; and determine, based on the fourth system feature and the fifth system feature, the second system feature supported by the network for the first network slice;

determine, based on the second system feature and the first system feature, a third system feature corresponding to the first network slice that can be used by the terminal device; and send the third system feature corresponding to the first network slice that can be used by the terminal device to the terminal device. the access network device is configured to:

send to the mobility management network element, information about a network slice supported by the access network device and a system feature supported by the network slice, wherein the network slice supported by the access network device comprises the first network slice and the system feature supported by the network slice comprises the fifth system feature.

20. The system of claim 19, wherein the system further comprises a network slice management network element, wherein the mobility management network element is further configured to:

receive, from the network slice management network element, information about a network slice supported by the core network and a system feature supported by the network slice, wherein the information about the network slice comprises information about the first network slice, and the system feature supported by the network slice comprises the fourth system feature;

the access network device is further configured to:
receive, from the network slice management network element, information about a network slice supported by the access network device and a system feature supported by the network slice, wherein the information about the network slice comprises information about the first network slice, and the system feature supported by the network slice comprises the fifth system feature;

the network slice management network element is configured to:
send first configuration information to the mobility management network function, wherein the first configuration information comprises information about the network slice supported by the core network and the system feature supported by the network slice;
send second configuration information to the access network device, wherein the second configuration information comprises information about the network slice supported by the access network device and the system feature supported by the network slice.

* * * * *

UNITED STATES PATENT AND TRADEMARK OFFICE
CERTIFICATE OF CORRECTION

PATENT NO. : 11,539,580 B2
APPLICATION NO. : 17/134362
DATED : December 27, 2022
INVENTOR(S) : Jingwang Ma It is certified that error appears in the above-identified patent and that said Letters Patent is hereby corrected as shown below:

In the Claims

Claim 18, Column 26, Line 24: "interne" should be "internet"

Signed and Sealed this
Twenty-first Day of February, 2023

Katherine Kelly Vidal
*Director of the United States Patent and Trademark Office*